United States Patent [19]
Caruel et al.

[11] 3,937,011
[45] Feb. 10, 1976

[54] FUEL INJECTOR FOR ATOMIZING AND VAPORIZING FUEL

[75] Inventors: Jacques Emile Jules Caruel, Dammarie-les-Lys; Jean Robert Bedue, Creteil; Bernard André Cantaloube, Chennevieres, all of France

[73] Assignee: Societe Nationale d'Etude et de Construction de Moteurs d'Aviation, Paris, France

[22] Filed: Nov. 12, 1973

[21] Appl. No.: 414,945

[30] Foreign Application Priority Data
Nov. 13, 1972 France .............................. 72.40166
Oct. 26, 1973 France .............................. 73.38253

[52] U.S. Cl. ............ 60/39.71; 60/39.74 B; 239/404; 239/406
[51] Int. Cl.² ....................... F02G 3/00; B05B 7/10
[58] Field of Search ..... 60/39.74 R, 39.71, 39.74 B; 239/403, 404, 405, 400, 406

[56] References Cited
UNITED STATES PATENTS

| | | | |
|---|---|---|---|
| 3,254,846 | 6/1966 | Schreter et al. .................... | 239/400 |
| 3,684,186 | 8/1972 | Helmrich ........................... | 239/403 X |
| 3,703,259 | 11/1972 | Sturgess et al. ................ | 60/39.74 R |
| 3,713,588 | 1/1973 | Sharpe .............................. | 239/400 |

*Primary Examiner*—Carlton R. Croyle
*Assistant Examiner*—Thomas I. Ross
*Attorney, Agent, or Firm*—William J. Daniel

[57] ABSTRACT

A fuel injector in which, an annular intermediate flow containing fuel is sandwiched between an inner and an outer flow of air caused to rotate by swirl-promoting bladed devices called "swirlers," the inner flow being generated in a tubular duct which is closed at its upstream end with a bottom plate, and the "swirler" associated with said inner flow being a centripetal bladed device that opens to the tubular duct upstream of an annular duct supplied with fuel and itself opening at its downstream end to the tubular duct, thus forming a sharp enlargement within the tubular duct.

14 Claims, 5 Drawing Figures

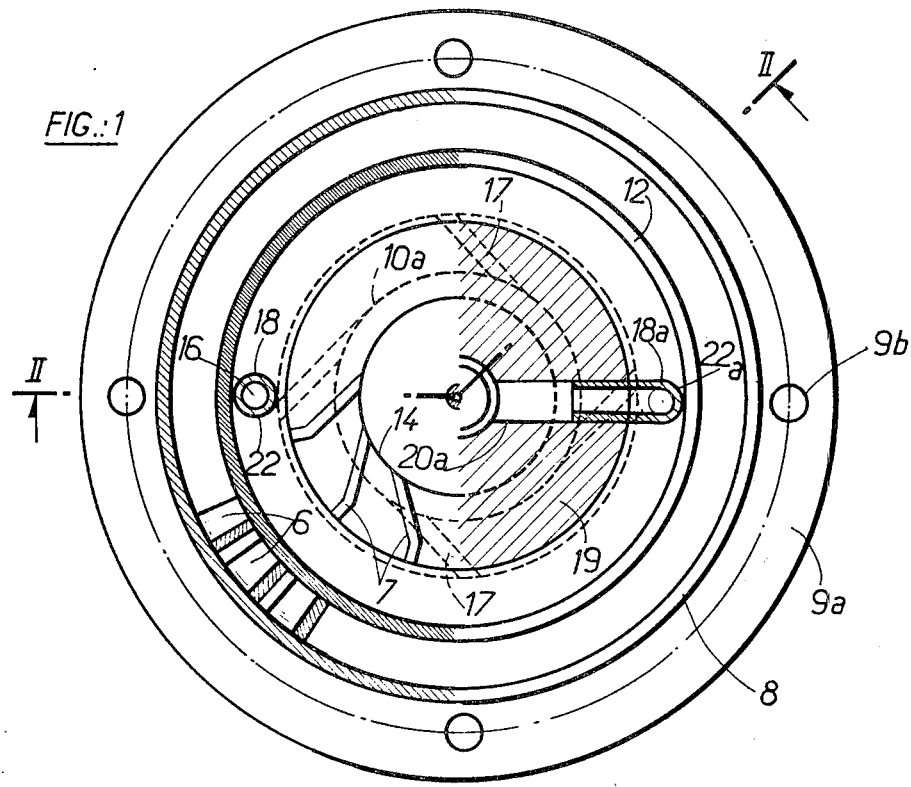
FIG.:1
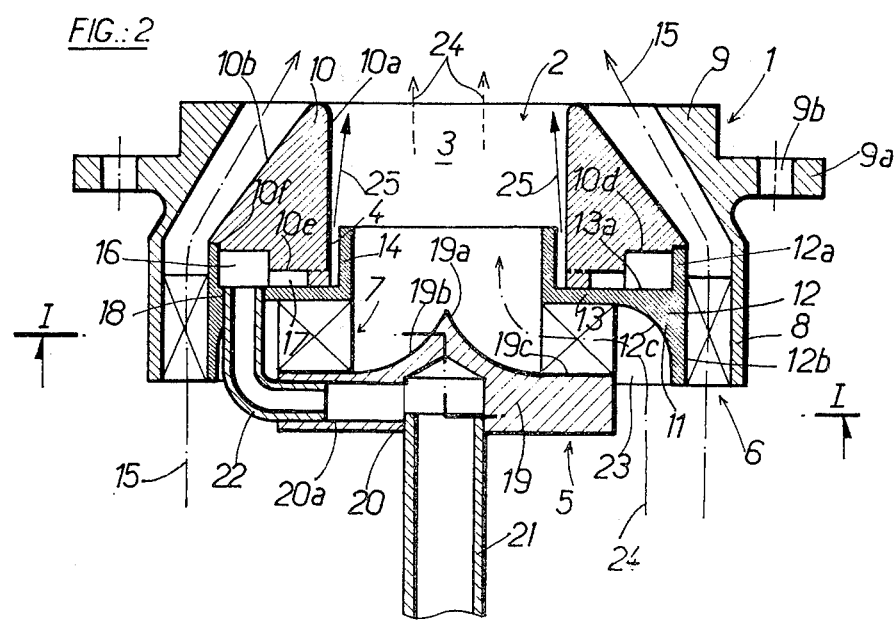
FIG.:2

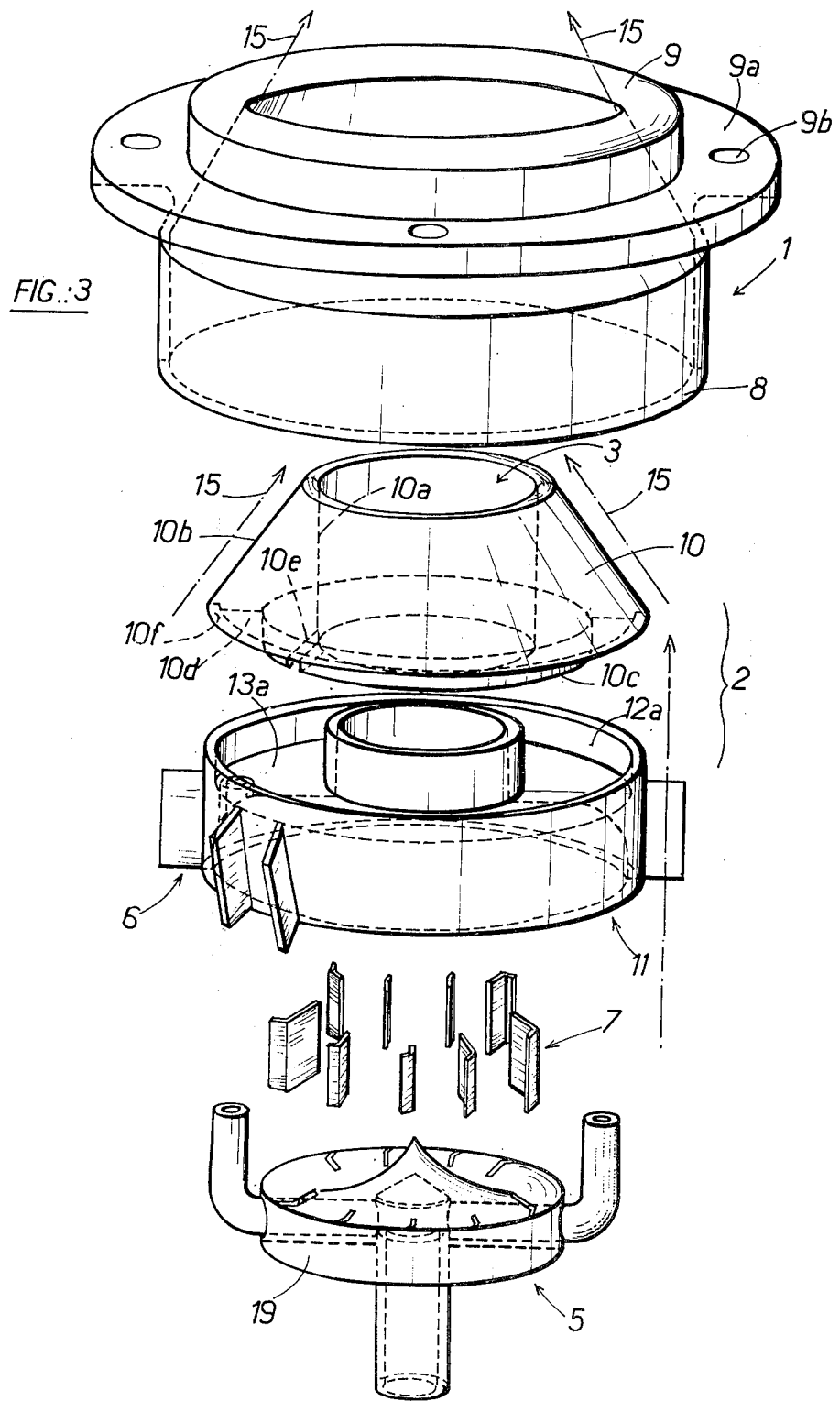

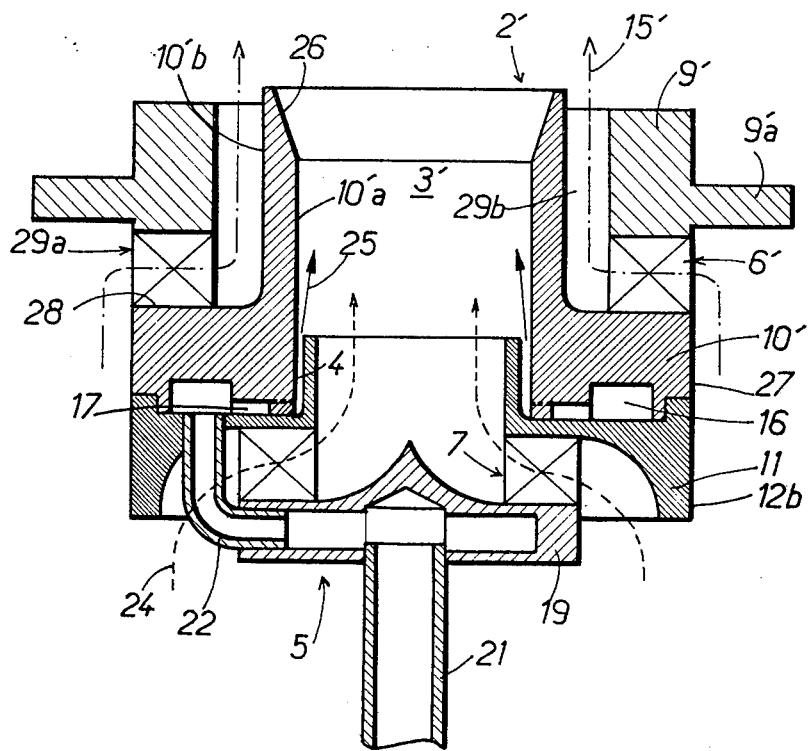
FIG.: 4

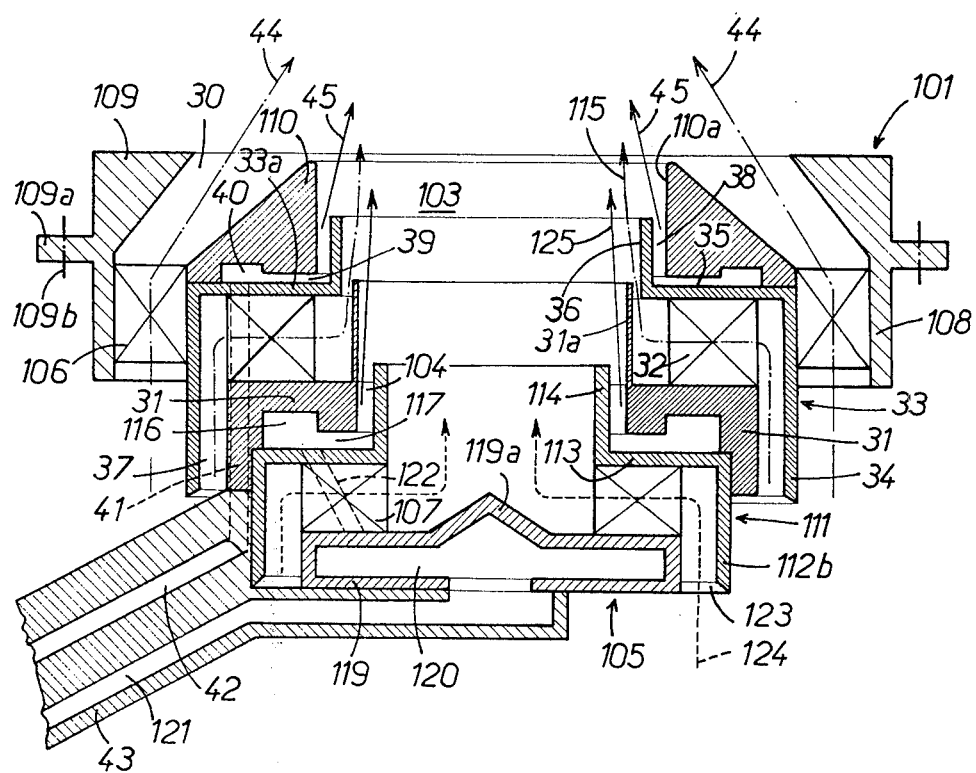
FIG.:5

FUEL INJECTOR FOR ATOMIZING AND VAPORIZING FUEL

The invention relates to fuel injectors, particularly those suitable for aircraft jet engines. The invention is concerned more specifically with an injector of the type in which an annular intermediate flow containing fuel is sandwiched between a first or inner air flow and a second or outer air flow caused to rotate by swirl-promoting bladed devices that are sometimes called 'swirlers", whereby the inner and outer flows exert a shearing effect on the intermediate flow, so as to accelerate atomisation and vaporisation of the fuel.

It is quite obvious that, the more powerful the shearing effect, the more rapid the atomisation and the vaporisation will be but one must prevent local overpressures, generated by interaction of the flows, from inducing a backflow of the fuel in a reverse direction. In addition, the atomised and vaporised fuel is intended to burn within a stream of hot gases, and the swirling movement generated by the bladed devices or swirlers within the flow emerging from the injector may create in the flow a zone of reduced pressure which forms what is called a "suction cone" of the hot gases. Such a suction cone promotes vaporisation of the fuel, but generally brings about an over-heating effect with the risk of the injector getting damaged.

An object of the invention is to provide an injector of the type mentioned above which, in use, produces a a powerful shearing effect without incurring the risk of a backflow of the fuel in the reverse direction. A further object of the invention is to provide an injector which, produces a suction cone without running the risk of getting damaged by heat.

According to the invention, the inner air flow is generated in a tubular duct which is closed at its upstream end by a bottom plate and is caused to rotate by a centripetal bladed device or swirler which communicates with the tubular duct upstream of an annular duct supplied with fuel and itself opening at its downstream end to the tubular duct, thus forming a sharp enlargement within the tubular duct so that an air-and-fuel mixture is channelled downstream along the wall of the tubular duct through the agency of the inner flow, to be then sandwiched between this flow and the outer flow of air which is caused to pass around the tubular duct.

The fuel supplied to the annular duct is preferably caused to rotate. It is then urged against the outer wall of the annular duct because of centrifugal force and hot air is sucked in along the axis of the injector. If the inner wall of the annular duct does not extend to the end of the injector, the air-and-fuel mixture may start forming inside the injector and the fuel may begin to vaporise.

According to a further feature of the invention, fuel entering the injector passes into channels made in the bottom plate which closes the front of the tubular duct. This bottom plate is cooled as a result of the entirety of the fuel reaching the central part of the bottom plate, thus preventing heat damage to the injector in spite of the formation of a suction cone. This cooling effect, in cooperation with the presence of the stream emerging from the centripetal swirler, also prevents the formation of carbon deposits in the centre of the injector.

The injector has anti-pollution properties, i.e. a jet-engine fitted with injectors according to the invention emits into the atmosphere appreciably less carbon monoxide, unburnt hydrocarbons and nitrogen oxides than does a jet-engine fitted with previous forms of injector. However, in a high-efficiency engine, these emissions may still be too high and it is a further object of the invention to increase the anit-pollution properties of the injector.

Thus, the second flow of air opens into the tubular duct upstream of a second annular duct which can be connected to a fuel supply system and which itself opens at its downstream end into the tubular duct, forming inside the latter a second sudden enlargement, and a third flow of air, which is caused to rotate by a third swirl-promoting blade device or swirler, passes around the tubular duct. The second flow is preferably generated by a centripetal bladed device or swirler.

The injector thus comprises a first fuel supply system providing a first intermediate flow which is sandwiched and subjected to a shearing effect between the inner flow of air and the second flow of air, and a second fuel supply system providing a second intermediate flow which is sandwiched and subjected to a shearing effect between the second flow of air and the third flow of air. The first supply system operates solely at low speed, and the two supply systems operate together in the "full-thrust" region. In other words, to cause the engine to operate at slow speed, the first intermediate flow contains the entirety of the "slow-speed" fuel supply and the fuel burns at high efficiency, which makes it possible to reduce the amount of carbon monoxide and of unburnt hydrocarbons emitted by the engine. To cause the engine to operate in other regions, and more especially in the full-thrust region, the fuel supply is divided between the two intermediate flows, this making it possible to reduce temperature variations in the combustion zone, and consequently the amount of nitrogen oxides emitted by the engine.

The invention will now be described by way of example with reference to the accompanying drawings which illustrate three embodiments of fuel injectors in accordance with the invention. In the drawings:

FIG. 1 is a sectional view of a fuel injector taken along the line I—I of FIG. 2, FIG. 2 is a sectional view of the injector taken along the line II—II of FIG. 1, FIG. 3 is an exploded view of the injector shown in FIGS. 1 and 2, FIG. 4 is a view similar to that of FIG. 2 and showing a second embodiment, and FIG. 5 is a sectional view of a third embodiment.

The fuel injector shown in FIGS. 1 to 3 consists of three parts assembled together, namely an outer part in the form of an annular cap 1, an annular central part 2 forming a tubular duct 3 which has an annular duct 4 opening on to it, and a rear part 5 forming the bottom plate of the tubular duct 3. The central part 2 is linked to the cap 1 and to the bottom plate 5 by two bladed devices 6, 7, which form an axial swirler and a centripetal swirler respectively. The cap 1 includes a cylindrical rear portion 8 and a front portion 9, which is internally of frusto-conical shape, provided with an external flange 9a pierced with holes 9b which serve for attachment of the injector to a combustion chamber (not shown).

Central part 2 is made up of two annular units 10, 11. Annular unit 10 forms a partitioning jacket having an axial cross-section which is almost triangular and presenting an inner cylindrical wall 10a and an outer frusto-conical wall 10b. It also has a flat rear wall 10c provided with an annular recess 10d, with grooves 10e extending from the recess and opening tangentially to the cylindrical inner wall 10a (only one of these grooves is shown in FIG. 3) and with a peripheral groove 10f. The annular unit 11 comprises an outer part 12 connected by means of an annular plate 13 to a cylindrical inner part 14. The outer shield 12 forms, ahead of plate 13, a cylindrical appendix 12a the forward end of which fits into, and is welded in, the groove 10f so that the flat front face 13a of the plate 13 is applied against the flat rear face 10c of the jacket 10. This outer part 12 has an outer cylindrical wall 12b to which the inner edges of the blades 6 are welded, the outer edges of these blades being welded to the rear part 8 of the cap 1. The blades 6, of which only a few are shown in FIGS. 1 and 3, are inclined in such a way as to impart a rotating movement to an outer or second air flow, indicated diagrammatically by chain-dotted arrows 15, which air enters axially the annular channel between the wall 12b and the cylindrical part 8.

The rear surface of the annular plate 13 comprises a flat inner part which is linked by a curvate portion 12c (of large radius) to the inner wall of the outer part 12b. The cylindrical inner part 14 is entirely located ahead of the plate 13 and extends for approximately one-third of the axial length of the jacket 10, defining along with the inner wall 10a the annular duct 4 which opens to the tubular duct 3, thus forming a sharp enlargement of the duct 4. The central part 2 of the injector, made up of the assembled units 10 and 11, forms an internal annular chamber 16 which is disposed between the flat front face 13a of the plate 13 and the recess 10d, and from which channels 17 extend to pass between the flat face 13a and the grooves 10e, and to open tangentially to the annular duct 4. The plate 13 is traversed by two diametrically opposite holes 18, 18a, which open axially to the annular chamber 16.

The rear part 5 of the injector comprises a circular end plate 19 the rear face of which is pierced by a blind bore 20 in which a tube 21 is fitted. The blind bore 20 is intersected by a transverse bore 20a which passes diametrically across the end plate 19. In each end of this transverse bore is fitted a tube 22, 22a which is curved so as to be parallel to the tube 21. The front ends of the tubes 22, 22a fit into the holes 18 and 18a respectively. The front face of the end plate 19 comprises a tapering central part 19a which is linked by a curvate portion 19b (of large radius) to a flat annular peripheral part 19c. The rear edges of the blades 7 are welded to this flat part 19c and the front edges of the blades 7 are welded to the flat inner part of the rear face of the annular end plate 13. The circular plate 19 is thus attached to the central part 2 of the injector so as to form the bottom of the tubular duct 3 and so as to define, together with the annular plate 13, an annular duct 23 for the introduction into the tubular duct 3, upstream of the annular duct 4, of an inner or first flow of air indicated diagrammatically by arrows 24 drawn with broken lines. The blades 7, of which only a few are shown in FIG. 1, are inclined in such a way as to form a centripetal swirler which imparts a rotating movement to the inner air flow 24 in the same direction as the outer flow 15.

The injector, attached by means of its flange 9a to the front part of a combustion chamber (not shown), is positioned, in use, in an axial airflow which enters the intake of the duct 23 so as to form the inner flow of air 24 which issues in a swirling movement from the tubular duct 3, and also enters the swirler 6 so as to form the outer flow of air 15 which issues in a swirling movement around the inner flow 24, and passes by way of the channel formed between the frusto-conical outer wall 10b of the jacket 10 and the frusto-conical inner wall of the part 9 of the cap 1. The tube 21 is supplied with liquid fuel which enters the annular chamber 16 via the bore 20a and the tubes 22, 22a and leaves the chamber via the channels 17. The fuel is thus discharged tangentially into the annular duct 4 in the form of a liquid stream to which a rotational movement has been imparted in the same direction as the inner flow of air 24. This rotating liquid flow, which has a tendency to adhere to the wall 10a of the jacket 10, is swept along by the inner flow 24 so as to leave the annular duct 4, forming an intermediate annular flow which is indicated diagrammatically by the arrows 25. The intermediate flow 25 moves along the wall 10a and is then sandwiched and flattened between the inner flow 24 and the outer flow 15, the resultant shearing effect accelerating atomisation and vaporisation of the fuel and improving combustion inside the combustion chamber (not shown).

It should be noted that the cylindrical inner part 14 of the unit 11 forms a wall which provides a shield for the air-and-fuel mixture which extends for a distance sufficient to ensure that the mixture will not tend to flow back in the upstream direction through the duct 23. It is also to be noted that the end plate 19, which closes off the upstream end of the tubular duct 3, cannot give rise to carbon deposits because these are swept away by the air from the inner swirler. The end plate 19 cannot become over-heated because of the internal cooling which is obtained by the fuel flowing in the bore 20a. This constitutes a considerable advantage, because the majority of known injectors of the type referred to run the risk of overheating in the centre, as well as of the deposition of carbon in this area.

In the embodiment shown in FIGS. 1 to 3, the outer and inner air flow turn in the same direction, a factor which favours combustion stability. In an injector intended for fitting on a combustion chamber that has a tendency to produce a lot of smoke, there would be some advantage in arranging for the two flows to turn in opposite directions.

It should also be noted that the arrangement described above and illustrated in FIGS. 1 to 3 (the bladed device 7 forming a centripetal swirler, the particular shaping of the faces 19a and 19b, and the arrangement for the fuel inlets which causes no appreciable wake of turbulence in the rotating inner flow) makes it possible to obtain an inner flow 24 adapted to create, in the hot gas stream downstream of the injector, an area of reduced pressure which forms a suction cone for the hot gases. The suction cone, which — as has already been explained — is highly favourable to combustion, does not incur the risk of bringing about deterioration in the injector through overheating, in view of the considerable cooling effect provided by the passage of fuel through the bore 20a, the tubes 22 and 22a, the annular chamber 16 and the channels 17.

A number of modifications can be made to the embodiment described above. For example, instead of causing the fuel to flow along a diametral channel 20a in the end plate 19, it would be possible to make it flow along one or more channels linked to one or more ports in the annular chamber 16. In another modification, the fuel could flow within the blades themselves of the centripetal swirler; this would have the advantage that the turbulence created by the obstacles constituted by the tubes 22 would be completely eliminated. Nor would one go beyond the scope of the invention by replacing the axial swirler 6 by a centripetal swirler such as is shown as 6' in FIG. 4.

The fuel injector shown in FIG. 4 comprises, as does the one in FIGS. 1 to 3, a central part 2' which forms a tubular duct 3' closed at its upstream end by a bottom plate 5. The inner air flow 24 is, again, produced by a centripetal swirler 7, but the outer stream 15' is produced by a swirler 6' which is also centripetal. The central part 2' comprises an annular unit 11 similar to that in FIGS. 1 to 3, and an annular jacket 10' which differs from the jacket 10 in that it has an axial section which is of generally L-shape, in that its inner wall includes a cylindrical portion 10'a followed by a short frusto-conical divergent portion 26, and in that its outer wall includes a cylindrical portion 27 which fits on to the cylindrical outer wall 12b of the unit 11, the cylindrical portion 27 being connected by a flat portion 28 to a cylindrical portion 10'b which is of a smaller diameter.

The cap 1 is replaced by a short cylindrical unit 9' of the same external diameter as the cylindrical portion 27 and of an internal diameter which is slightly larger than the external diameter of the wall 10'b. The blades of the swirler 6' are welded at their rear edges to the flat portion 28, and at their front edges to the rear edge of the unit 9'. The latter, together with the jacket 10' defines an annular channel which comprises a centripetal portion 29a that opens radially to the outside of the injector, and an axial portion 29b that emerges around the outlet of the tubular duct 3'. The outer flow of air 15' bled from the stream of air in which the injector is immersed flows through this annular channel and the flow rate of the flow 15' is determined by the static pressure of the stream, and not by its head pressure, as was the case with the embodiment shown in FIGS. 1 to 3. The blades of the swirler 6' are inclined in the same direction as the blades of the swirler 7 but they could alternatively be inclined in the opposite direction.

The injector shown in FIG. 5 has a structure resembling those shown in the preceding figures, and corresponding parts are designated by the same reference numbers but increased by a hundred. The tubular duct 103 is closed at its upstream end by the bottom plate 105, and its downstream end portion is bounded by the annular jacket 110 which has a virtually triangular axial section and is connected to the cylindrical rear portion 108 of the annular cap 101 by a bladed device 106 which forms an axial swirler. The annular duct included between the front portion 109 of the said cap 101 and the jacket 110 is designated by the reference number 30. The bottom plate 105, afforded by the circular end plate 119 having on its upper face a conical central portion 119a, is connected to the annular plate 113 of the annular unit 111 by the centripetal swirler 107 which is intended to cause rotation of the first or inner air flow 124 entering by means of the annular duct 123, and to discharge it into the tubular duct 103. The cylindrical inner shield 114 of the unit 111 provides the inner boundary of the annular duct 104 which opens to the tubular duct 103 by way of a sharp enlargement and which is normally supplied with fuel by the ducts 117 leading from the annular chamber 116, which is itself supplied with fuel through the swirler 107 by the ducts shown diagrammatically at 122. The ducts 122 extend from the central cavity 120 of the bottom plate 105 which is connected by the pipe 121 to a fuel supply (not shown).

However, the annular duct 104 is not bounded externally by the jacket 110, but by an annular part 31 in which are formed the annular chamber 116 and the ducts 117 and which itself includes a cylindrical wall 31a which defines part of the outer boundary of the tubular duct 103. The part 31 is connected by a bladed device 32 which forms a centripetal swirler to an annular plate 35 forming part of an annular unit 33 which comprises, as does the unit 111, an outer portion 34 joined by the plate 35 to a cylindrical inner portion 36. The outer portion 34 is attached to the annular part 110 and is connected by the bladed device 106 to the cylindrical rear portion 108 of the annular cap 101. Outer portion 34 extends towards the upstream part of the injector, defining around the part 31 and annular duct 37. The cylindrical inner portion 36 extends for part of the length of the jacket 110 thus defining, together with the inner wall 110a of the latter, a second annular duct 38 which opens to the tubular duct 103, forming in the latter a second sharp enlargement. The annular duct 38 is connected by ducts 39 to a second annular chamber 40, which is itself connected by ducts (which are shown diagrammatically at 41 and pass through the part 31 and through the swirler 32), to a pipe 42 which can be connected to the fuel supply (not shown). The pipe 42 and the pipe 121 run inside a fuel delivery line 43.

It should be noted that the configuration and mode of assembly of the second centripetal swirler 32 and of the annular part 33 defining the second annular duct 38 are identical with the configuration and mode of assembly of the first centripetal swirler 107 and of the annular part 111 defining the first annular duct 104, that the annular chamber 40 and the ducts 39 are identical with the annular chamber 116 and with the ducts 117, and that the passage through the swirler 32 formed by the ducts 41 can be effected in the same manner as the passage through the swirler 107 formed by the ducts 122. Components 107, 111, 104, 116, 117 and 122, which are shown diagrammatically, have configurations the same as the corresponding components of the preceding figures. It is therefore unnecessary to describe them again in detail.

As in the preceding figures, the cap 101 is provided with a flange 109a which enables one to mount the injector at 109b, on the rear portion of a combustion chamber (not shown) of an aircraft engine, so that in operation the injector is positioned in an axial stream of air. The air comes in at the entrance to the duct 123 so as to form the first or inner flow of air 124, which is discharged with a swirling movement at the upstream end of the tubular duct 103. The air also enters the intake of the duct 37 so as to form the second flow of air 115 which is caused to rotate by the centripetal swirler 32 and is discharged with a swirling movement into the tubular duct 103 between the downstream end of the cylindrical shield portion 114 and the cylindrical portion 36. In addition, the air enters the swirler 106 so as to form a third flow of air 44 which emerges with a swirling motion around the second flow 115, by way of the duct 30.

The fuel supply system (not shown) comprises means for opening and closing the pipes 121 and 42 and for independently adjusting the rates of delivery of fuel along these two pipes. In order to make the engine run at slow speed, the pipe 42 is closed and the pipe 121 is fed at a so-called slow-speed rate of flow. The duct 123 and the swirler 107 have such dimensions that, when the engine is thus turning at slow speed, with the aircraft either motionless or taxi-ing on the ground, the throughput of the inner stream of air 124 forms a virtually stoichiometric mixture with the fuel emerging from the annular duct 104 at the slow-speed delivery rate. The fuel issues from the annular duct in the direction indicated by the arrow 125 and is subjected to a shearing action between the flows of air 124 and 115, being atomised and vaporised as in the preceding figures. Here too there is produced a suction cone of hot gases which further accelerates vaporisation of the fuel. The latter burns with a very high efficiency, without producing carbon monoxide and without the emission of unburnt hydrocarbons. The third flow of air 44 merely encircles the second flow 115.

To make the engine operate in other regions, the rate of delivery of fuel is increased, but it is divided between the pipes 121 and 42. The fuel emerging at 125 from the first annular duct 104 is sandwiched between the inner flow 124 and the second flow 115, as in the preceding figures; the fuel supplied to the pipe 42 passes by way of the ducts 41 into the annular chamber 40, passes from here by way of the ducts 39 into the second annular duct 38, from which it emerges in the direction of the arrow 45 and is sandwiched between the second flow 115 and the third flow 44 which together effect a shearing action on it, so bringing about its atomisation and its vaporisation, and improving its combustion. Combustion thus occurs in two stages, which makes it possible to obtain a more uniform combustion temperatures, and consequently to reduce the output of nitrogen oxides. It is indeed well-known that nitrogen oxides form in the hottest zones, the rate of their formation varying exponentially as a function of the temperature.

All the modifications described with reference to the preceding figures could be employed; the fuel supplied to the second annular duct 38 can with advantages be caused to rotate, preferably in the same direction as the second flow of air, and the axial swirler 106 could be replaced by a centripetal swirler like the swirler 6' in FIG. 4.

In the embodiment described, the swirler 32 which gives rise to the second air flow is centripetal; this arrangement is advantageous because it does not produce any turbulence in the second air flow giving rise to heterogeneity in the intermediate air-and-fuel flow situated between the second flow and the third flow. However, it would not be beyond the scope of the invention to create the second flow by means of an axial swirler.

In general, a selection will be made of the relative directions of rotation of the swirlers according to whether greater importance is attached to combustion at a low speed or at a high speed. The rotation of two flows of air in a single direction favours stability of combustion of the intermediate fuel flow which is of importance at low speeds. Rotation in opposite directions favours the achieving of complete homogeneity of air-and-fuel mixture, which is of importance at high speeds. However, in certain cases, it may be of advantage to make the second flow rotate in the reverse direction compared to the other two flows.

What is claimed is:

1. A fuel injector for atomizing and vaporizing fuel into an airflow, comprising a jacket (10) with a generally cylindrical inner surface (10a) having its axis generally parallel to the airflow direction, means (11) structurally associated with said jacket to form a generally cylindrical shield (14) extending coaxially with and over a substantially smaller axial extent than said cylindrical inner surface (10a), said axially smaller cylindrical shield (14) being spaced internally of an upstream section only of said cylindrical inner surface (10a) and ending short of a downstream section of said cylindrical inner surface (10a) thus leaving said downstream section unshielded, whereby said shield (14) defines with said cylindrical surface (10a) both a stepped tubular duct (3) and an annular duct (4) bounded by said shield (14) and said upstream section of said inner surface (10a), plugging means (5) fitted at the upstream end of said tubular duct (3) to bottom the same, a centripetal air swirler (7) leading into said tubular duct (3) and fitted upstream of said shield (14), means (23) tapping air from said airflow to feed said centripetal air swirler (7) thereby producing an inner whirl of air (24) through said tubular duct (3) towards the downstream end of said jacket (10), means (6) for producing an outer whirl of air (15) around said jacket (10) towards the downstream end of said jacket (10), and piping means (21, 20a, 22, 16, 17) for supplying fuel to said annular duct (4).

2. Fuel injector as claimed in claim 1, wherein said plugging means (5) comprises an end-plate (19), and wherein said piping means comprises a passage (20a) formed in said end-plate (19) and connected to said annular duct (4), and a fuel supply line (21) opening into said passage, whereby fuel flowing therethrough cools said end-plate (19).

3. Fuel injector as claimed in claim 2, wherein said end-plate is in the form of a hollow bottom member (119) having an inner space (120) which is supplied with fuel from said line (121).

4. Fuel injector as claimed in claim 1, wherein said shield (14) comprises an annular unit (11) having an outwardly extending upstream section (13), wherein said plugging means (5) comprises a disc-shaped end-plate (19) bottoming said tubular duct (3) in entirety at said upstream end thereof and having adjacent said tubular duct (3) an inner face which presents a central tapering portion (19a) exposed to and projecting inwardly of said tubular duct (3) to bottom the same, and a peripheral flat portion (19c) axially spaced from said upstream section (13) of said annular unit (11) to define therebetween a centripetal air intake (23), and wherein said centripetal air swirler (7) comprises blades fitted in said centripetal air intake (23).

5. Fuel injector as claimed in claim 4, wherein said piping means comprises an annular chamber (16) extending between said jacket (10) and said outwardly extending upstream section (13) of said annular unit (11) on the opposite side thereof relative to said centripetal air intake (23), a plurality of channels (17) extending from said annular chamber (16) and opening tangentially into said annular duct (4), and means (21, 22) for delivering fuel to said annular chamber (16).

6. Fuel injector as claimed in claim 5, wherein said fuel delivering means comprises at least one passage (20a) extending radially within said end-plate (19), and a bent tube (22) connecting said passage (20a) with said annular chamber (16) across said centripetal air intake (23).

7. Fuel injector as claimed in claim 5, wherein said fuel delivering means comprises at least one passage (120) formed in said end-plate (119), and fuel passages (122) bored within the thickness of said centripetal air swirler blades (107).

8. Fuel injector as claimed in claim 1, wherein said piping means comprises a fuel swirler (17) adapted to cause fuel to whirl through said annular duct (4) and along said unshielded downstream section of said cylindrical surface (10a).

9. Fuel injector as claimed in claim 8, wherein said fuel swirler (17) is designed so that fuel is whirled through said annular duct and along said unshielded downstream section in the same direction of rotation as said inner whirl of air (24) through said tubular duct (3).

10. Fuel injector as claimed in claim 1, further comprising a further jacket (110) arranged coaxially around said first mentioned jacket (31a) and having a substantially cylindrical further inner surface (110a) extending downstream beyond said first mentioned jacket (31a), means (35) forming a substantially cylindrical further shield (36) inwardly spaced from and extending coaxially along an upstream portion only of said further inner surface (110a) to end short of a further downstream section of said further inner surface (110a) thus leaving said further downstream section unshielded, whereby said further shield (36) defines with said further inner surface (110a) a further annular duct (36) therebetween and said further shield (36) also defines an annular passage between said first mentioned jacket (31a) and said further shield (36), a further air swirler (32) leading into said annular passge and means (37) for feeding the same with air from said airflow to generate said outer whirl of air (115) and discharge the same through said annular passage, means for forming around said further jacket (110) a further outer whirl of air (44), further fuel supply means for supplying said further annular duct (38) with fuel, and means (121, 42) for feeding said fuel supply means and said further fuel supply means with fuel separately.

11. Fuel injector as claimed in claim 10, wherein said further air swirler (32) is a centripetal air swirler.

12. Fuel injector as claimed in claim 10, further comprising means to cause fuel to whirl in said further annular duct (38) and along said unshielded further downstream section of said further inner surface (110a).

13. Fuel injector as claimed in claim 12, wherein fuel is whirled in said further annular duct (38) and along said unshielded further downstream section in the same direction of rotation as said outer whirl of air (115).

14. Fuel injector as claimed in claim 1, wherein said piping means comprises a tube (22) extending across said air tapping means (23) and upstream of said centripetal air swirler (7).

* * * * *